United States Patent [19]

Ginsberg

[11] Patent Number: 5,774,880
[45] Date of Patent: Jun. 30, 1998

US005774880A

[54] FIXED INCOME PORTFOLIO INDEX PROCESSOR

[75] Inventor: Philip Myron Ginsberg, Calabasas, Calif.

[73] Assignee: Cantor Fitzgerald & Co., Inc., New York, N.Y.

[21] Appl. No.: 396,422

[22] Filed: Feb. 28, 1995

Related U.S. Application Data

[63] Continuation of Ser. No. 897,377, Jun. 10, 1992.
[51] Int. Cl.$^6$ .................................................. G06F 17/60
[52] U.S. Cl. ............................................................ 705/36
[58] Field of Search .................................. 705/235, 236, 705/237

[56] References Cited

U.S. PATENT DOCUMENTS

| | | |
|---|---|---|
| 4,674,044 | 6/1987 | Kalmus et al. . |
| 4,722,055 | 1/1988 | Roberts . |
| 4,750,121 | 6/1988 | Halley et al. . |
| 4,752,877 | 6/1988 | Roberts et al. . |
| 4,969,094 | 11/1990 | Halley et al. . |
| 4,975,840 | 12/1990 | DeTore et al. . |
| 5,132,899 | 7/1992 | Fox . |

OTHER PUBLICATIONS

Ho, T., *Strategic Fixed–Income Investment*, Chapters 9–10, Dow Jones–Irwin Publications, Homewood, Illinois (1990).
Leinweber, "Knowledge–Based Systems for Financial Applications," IEEE Expert Magazine, vol. 3, issue 3, 1988.

*Primary Examiner*—Amelia Au
*Attorney, Agent, or Firm*—Hopgood, Calimafde, Kalil & Judlowe, LLP

[57] ABSTRACT

A data processing system receives a continuous stream of real time transactional data regarding market transactions of fixed income securities. The incoming data is qualified and then used to determine the term structure of interest rates based on price information. The system provides linear interpolation techniques to complete an operative data set. This set is updated with current trade data, with term structure shifting using pivot points from newly qualified data. An index value for a pre-select portfolio of securities is then calculated and expressed in terms of price relative to par, yield to maturity and duration.

In a specific implementation using U.S. Treasuries as the monitored security, the index value supports an automated trading function for futures and/or options contracts based on the change in value of the index. The index provides a more accurate barometer of market changes and a more useful tool in measuring portfolio management for plan sponsors.

9 Claims, 6 Drawing Sheets

FIXED INCOME PORTFOLIO INDEX PROCESSOR

This is a continuation of copending application Ser. No. 07/897,377 filed on Jun. 10, 1992.

The present invention generally relates to data processing systems for tracking and manipulating data corresponding to fixed income portfolios and, more particularly, to data processing methods and apparatus directed to the real time determination of selected fixed income indices for use in accurately gauging interest rate profiles in real time and managing a specifically delineated set of automated transactions relating thereto.

FIELD OF THE INVENTION

A sizable portion of investment vehicles available in today's financial markets are universally characterized as fixed income securities. Exemplary fixed income securities will encompass government bonds, bills and notes auctioned at regular intervals by the U.S. and other foreign governments to finance governmental activities. This, of course, is one of many types of fixed income securities, others include corporate bonds, municipal bonds, etc. The common thread running between all fixed income securities is the payment of a set return to the investor over the life span of the security.

There are two forms of fixed income return to the investor. The first involves the provision of coupon payments at regular intervals, at the stated interest rate of the security. For example, a ten-year note may specify an 8% rate of interest on a $1,000 par value with coupons coming due twice each year for ten years. This translates to two $40 payments to the holder of the note for ten years with a final payment of $1040 (principal and interest). The other form of bond is called a zero coupon, or discount bond which provides no payment except for the final return of the face value of the bond at a specified date (e.g. ten years from issuance). The discount bond is sold at some fraction of its face value, with the interest rate discount a function of this and the term of the bond.

The fixed income securities distributed by the United States Government are known as U.S. treasuries. These instruments span maturity terms of 13 to 52 weeks (T-bills), one to ten years (notes), and up to 30 years (bonds). The T-bills are pure discount securities having no coupons. All other treasuries having longer terms are coupon notes or bonds, with a defined payment cycle of semi-annual payments to the holder.

Treasuries have characteristic properties that make them especially useful for the purposes of the present invention and, therefore, are used exclusively in the following discussions, with the fundamental tenant that the principles may be applied to other types of fixed income securities without departing from the inventive concepts. One important attribute of treasuries, in the context of the present invention, is the minimal and uniform default risk; the issuance of U.S. government paper removes the default risk as a defining criteria in the relative pricing of treasuries in the market place.

Treasuries are auctioned by the U.S. government at pre-established auction dates. The price for the treasuries having a face value with a set coupon rate will define the actual yield of the security. After the auction, the treasuries enter the secondary market and are traded typically "over the counter", i.e., without a defined exchange. As inflation expectations and market conditions change, the prices of the recently auctioned treasuries fluctuate. These price changes are reflected by competing bid and ask prices communicated among brokers and dealers in the secondary market. For example, the yield of a given treasury increases as its price drops in the market reflecting an overall increase in the interest rates for that term of security.

The newly auctioned securities are traded with and in conjunction with the securities issued in earlier auctions. In this context, some securities are traded more often than others and are called the "actives"; these usually correspond to the recent issues as opposed to the older securities in the market. Indeed, some older securities are infrequently traded, creating an illiquid market that may or may not reflect the true market determined interest rate for that maturity length security.

In January, 1992, there was a total of approximately $1.7 trillion of U.S. notes and bonds outstanding. The majority of issues in dollar terms are short term. The profile of maturities (i.e., the expiration date of the security) indicates that $730 billion or 43% of the total will mature over the period between 1994 and 2002 (2 to 10 years out). Another 34% will mature in 1993 and 1994 and about 3% from 2003 and 2005 and 20% maturing between 2006 to 2021. In this context, the period between 2 and 10 years out in time incorporates a concentrated portion of the entire market.

Treasuries are sold by the government to fund projects, mandated payments and make strategic investments that cannot be paid by current receipts. Treasuries are purchased by individuals and institutions for a variety of reasons, including the protection of principal with a low risk investment vehicle and the generation of known future cash flows to fund the needs of e.g., pension participants.

As can be realized by the foregoing description, the very size and diversity of the treasury market implicates an unprecedented level of sophistication by market participants in the pricing and transactions involving these securities. The very complexity associated with the transactions and the scale of trading undertaken by institutional participants necessitates a rigidly structured approach in trading. The capital at stake and the fluidity of future commitments makes it critical to have a method of measuring the performance of portfolio managers, so that plan sponsors for the pension plans and the like can precisely determine whether the capital under their control is properly invested.

In the past, the only barometer for fixed income investing was the stated price and yield for one or more specific instruments such as the 30 year treasury bond. These yield values would be quoted on an ad hoc basis as a general measure of market position and direction. More recently, several large brokerage houses have developed different indices to track the fixed income market beyond the single price issue. For example, Shearson-Lehman American Express has developed a T-Bond index value that calculates a weighted average of every bond in circulation. Other indices exist with similar mechanisms for tracking the credit marketplace.

There are several significant drawbacks to the use of these forms of indices. The actual value is calculated at the close of the financial markets and, therefore, is not a real time determination, and, in fact, rapidly becomes stale as trading continues overseas and during the next trading day in the United States.

Other problems also exist; taking the entire market into account necessarily includes lightly traded issues that skew the final value from extant market conditions. This is so as these lightly traded issues do not accurately reflect the term structure of interest rates as other investment criteria, e.g., tax implications, control their market price.

There has also been a significant need for a hedging instrument on fixed income investing. In this context, an investor might purchase a portfolio of long term bonds that are sensitive to small changes in interest rates; to hedge this investment, this investor would enter a futures contract to sell instruments at a specific date in the future. Alternatively and more desirably, the hedge could be made with an index corresponding to a defined set of securities. This is not practical with the presently available indices due to their reliance on a broad spectrum of securities in the defining basket; this precludes effective utilization of these indices as a basis for trading futures or option contracts.

From the above, it is apparent that there remains a substantial void in the credit markets and a corresponding need for a real time barometer of the fixed income securities marketplace for the evaluation of portfolio performance, the trends and current market conditions, and the trading of indexed future and option contracts for fixed income securities.

SUMMARY AND OBJECTS OF THE PRESENT INVENTION

It is, therefore, an object of the present invention to provide a system for selectively reducing a substantial amount of market data into a simplified index instrument for use to measure the characteristics of the credit markets associated with the trading of fixed income securities.

It is also an object of the present invention to provide a system for collecting in real time information on current market activity in fixed income securities and processing this information to quantify the term structure of interest rates in real time.

It is another object of the present invention to provide an apparatus for the select processing of several types of data wherein data is qualified prior to use and translating the qualified data into a term structure of interest rates for a hypothetical portfolio of predetermined fixed income securities.

It is still another object of the present invention to provide a system for generating a real time barometer of the fixed income market and delineating an index value associated with a basket of fixed income securities for use in support of automated trading in futures and options contracts.

The above and other objects of the present invention are realized in a specific illustrative data processing system for the compilation of large quantities of disparate market data into discrete data files of varying reliability. The data is thereafter qualified and then processed to calculate on an iterative basis the term structure of interest rates in real time for a defined cross-section of the fixed income securities marketplace. These values are then used to price a select, specifically delineated portfolio of fixed income securities having varying terms to bridge an appreciable cross-section of the active market in fixed income securities. The forgoing portfolio is characterized in terms of an index value having a current market price (discount or premium from par), a true yield to maturity value (YTM) and a quantified duration. As market conditions change, the processor selectively updates some or all of the governing securities and based thereon modifies the index pursuant to a pre-established criteria.

In accordance with the varying aspects of the present invention, the system further includes an automated trading module for receiving market qualified buy and sell instructions for futures and options contracts tied to the basket of securities forming the index.

DESCRIPTION OF THE DRAWINGS

The foregoing features and benefits associated with the present invention may be more fully appreciated pursuant to the following detailed discussion of a specific embodiment thereof, taken in conjunction with the Figures appended hereto, wherein.

DESCRIPTION OF THE PRESENT INVENTION

Figure 1:
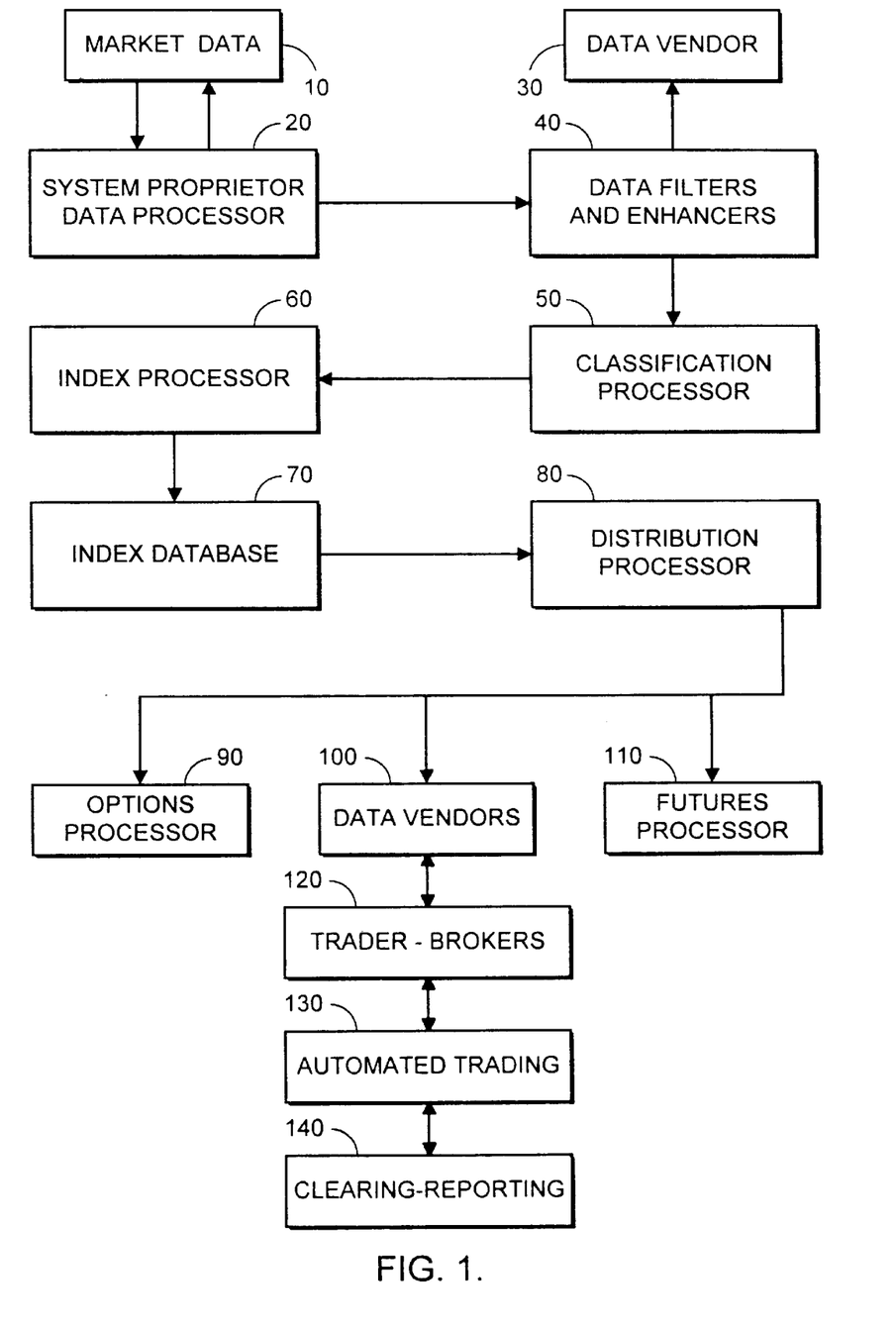
FIG. 1 is a functional block diagram of the discrete components forming the network associated with the present invention.

Turning now to FIG. 1, the overall information paths of the present invention are presented in block diagram form. Beginning with block 10, market data is collected from the plurality of on-line terminals operated by traders within the relevant bond market sector. A continual exchange of information flows between the traders, depicted in block 10, and the system proprietor, block 20, i.e., as bids, offers and trades are transacted in real time. This information is collected by the system proprietor and entered into the data processor database.

On-line market data is then transferred to the data filter and enhancer module, block 40, which acts to clarify and articulate the continuous incoming market data for use, e.g., by data vendors, block 30. One aspect of the data enhancer operation will be the conversion of on-line trading information into digital form for transmission to the classification processor, block 50. The operation of the classification processor is directed to creating a data set in proper format for further manipulation. This includes the generation of a coordinated array of data in matrix format.

Once properly formatted, the on-line market data is then transmitted to the index processor, block 60, for determination of a real time index value. This information is then loaded into the index database, block 70, and then passed to the distribution processor, block 80.

The foregoing operation will result in the final real time index value in terms of portfolio price, portfolio yield to maturity (YTM) and portfolio duration for distribution within the fixed income investment community. In the context of the present invention, three segments of this community are provided with the data, at block 90. System proprietors involved in automated options processing are provided the index values for quantifying and closing specific options positions pursuant to the trading of option contracts on the indexed portfolio. In a similar manner, the portfolio index data is provided to system proprietors regarding futures contracts to permit proper transactions in closing of future contracts based on the portfolio index.

The third channel of distribution for the portfolio index data is to the data vendors supplying the aforementioned index information, at block 100. This is followed by the continual distribution of the index values to traders and brokers within the investment community, block 120, the support of automated trading, block 130, and finally declaring and reporting functions associated with such trading, block 140.

Figure 5:
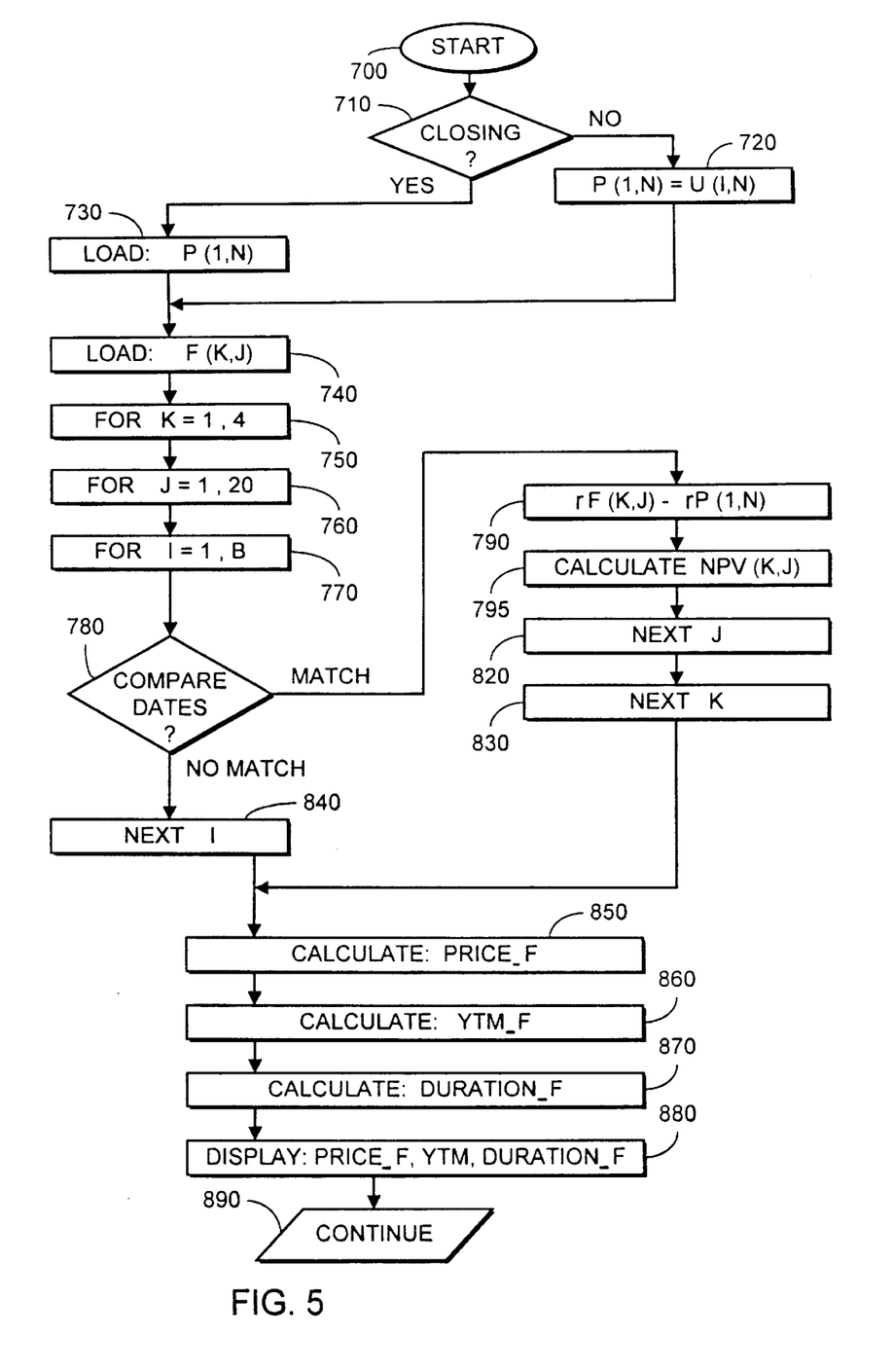
FIG. 5 is a logic flow chart depicting the processing associated with the determination and distribution of the Index Value.
Figure 6:
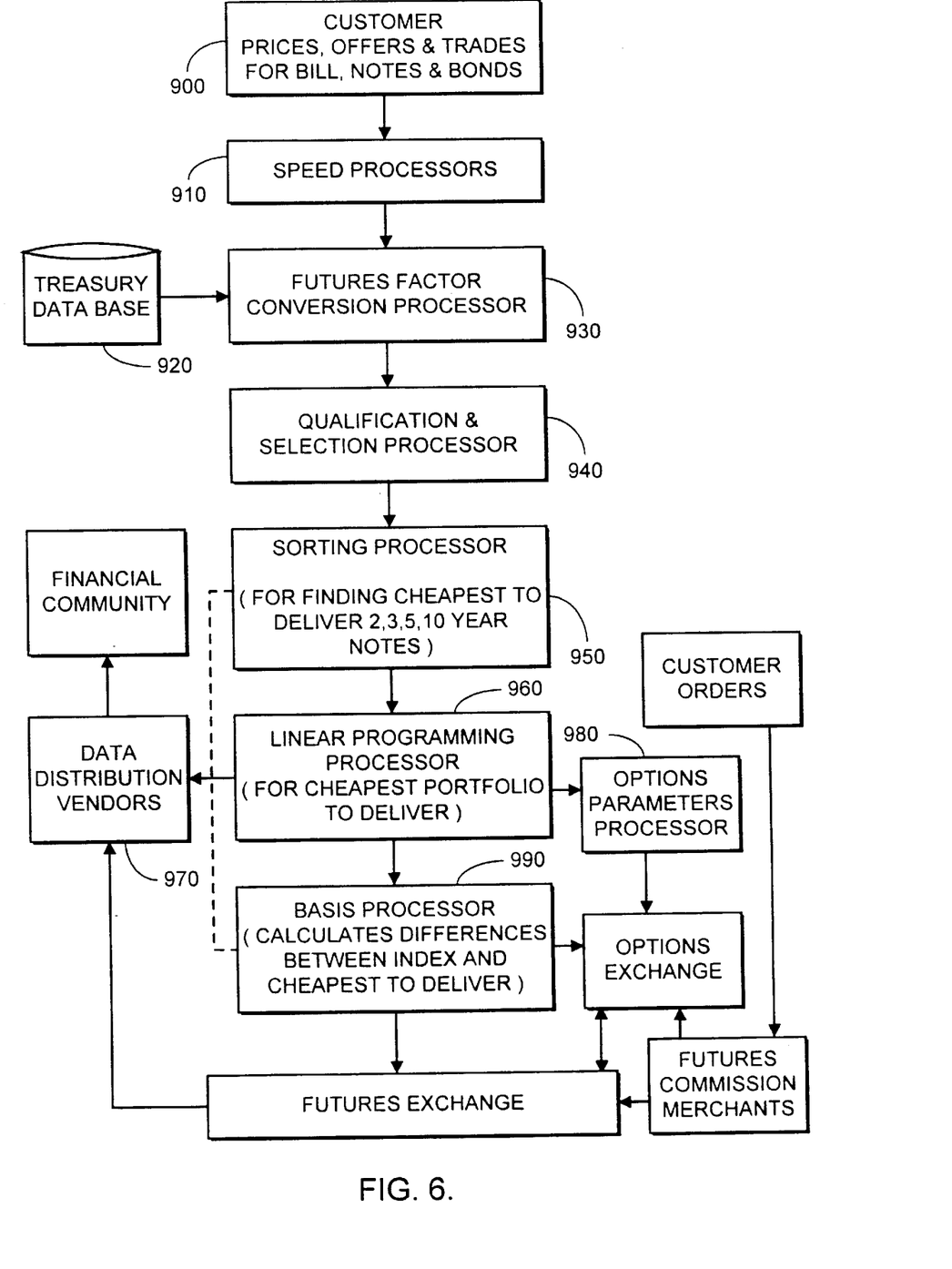
FIG. 6 is a logic flow chart depicting the information flow associated with managing futures/options transactions providing a least expensive portfolio of securities for delivery.

The above-identified processing modules for receiving market data and calculating a portfolio index based thereon are governed by a systems controlled program. As illustrated hereinbelow, this program is exemplified by several discrete modules for inter alia the selection and qualification of incoming data (FIG. 2), the determination of the term structure of interest rates (FIG. 3), updating the term structure with current price information (FIG. 4), the determination of the portfolio index characteristics based on the real time computer generated rate structure (FIG. 5), and the support of automated futures options transactions (FIG. 6).

First briefly in overview, the term structure determination is a math-intensive operation directed to the solution of multiple relationships comprising a like number of unknown quantities. These relationships involve the determination of the net present value of a future cash flow based on current information regarding the date of the future cash flow and current pricing.

Often, the data set is incomplete; therefore, the system employs interpolation techniques to provide missing points in the term spectrum. As provided below, the missing elements will invariably be close in time (e.g., within six months) of valid data points. This permits the use of linear interpolation for bridging missing data points with a reasonable degree of accuracy.

During the updating phase, the new price data will often reflect significant market movement, but will not displace the entire data set. The present invention, therefore, employs the use of pivot points, i.e., the updated values of price are used to "pivot" the entire term structure, including securities that have not been updated.

Once the real time term structure is characterized, the system quantifies a generic portfolio of securities comprising the following elements:

TABLE I

| Term (yrs.) | Coupon % | Face Value |
|---|---|---|
| 2 | 5 | $250,000 |
| 3 | 5½ | $250,000 |
| 5 | 6 | $250,000 |
| 10 | 7 | $250,000 |

This portfolio of four U.S. treasury notes has a total value of $1M, a duration of approximately 4.2 years and a yield to maturity of almost 6.25 when the four notes are each priced at par.

The foregoing portfolio is then market priced based on the current term structure previously calculated. The portfolio value is then presented in terms of an average par value (e.g., 104) with YTM and duration values. This index is particularly useful in tracking the treasury market, measuring portfolio performance and governing select futures/options contract trading.

With the foregoing brief dissertation, an illustrated implementation is presented hereinbelow.

The first operation involves the qualification of the incoming market data transmitted to the system. This is accomplished via the logic structure depicted in FIG. 2. Logic conceptually begins at block 200 and proceeds to block 210, initiating the index variable loop assigning memory address locations for incoming price data, block 220. The first operation is to determine whether incoming data represents "closing" figures associated with the end-of-day trading (i.e., fixed in time). A positive response to test 230 branches logic to block 240 wherein a first matrix of price information is formatted from the incoming closing data. In the context of the present example, this closing data could represent the final price information received on a daily basis from the United States Federal Reserve for the United States Treasury market. As this information represents a complete set of price data at a fixed point in time, it is labeled "P" for proper, block 250.

Figure 2:
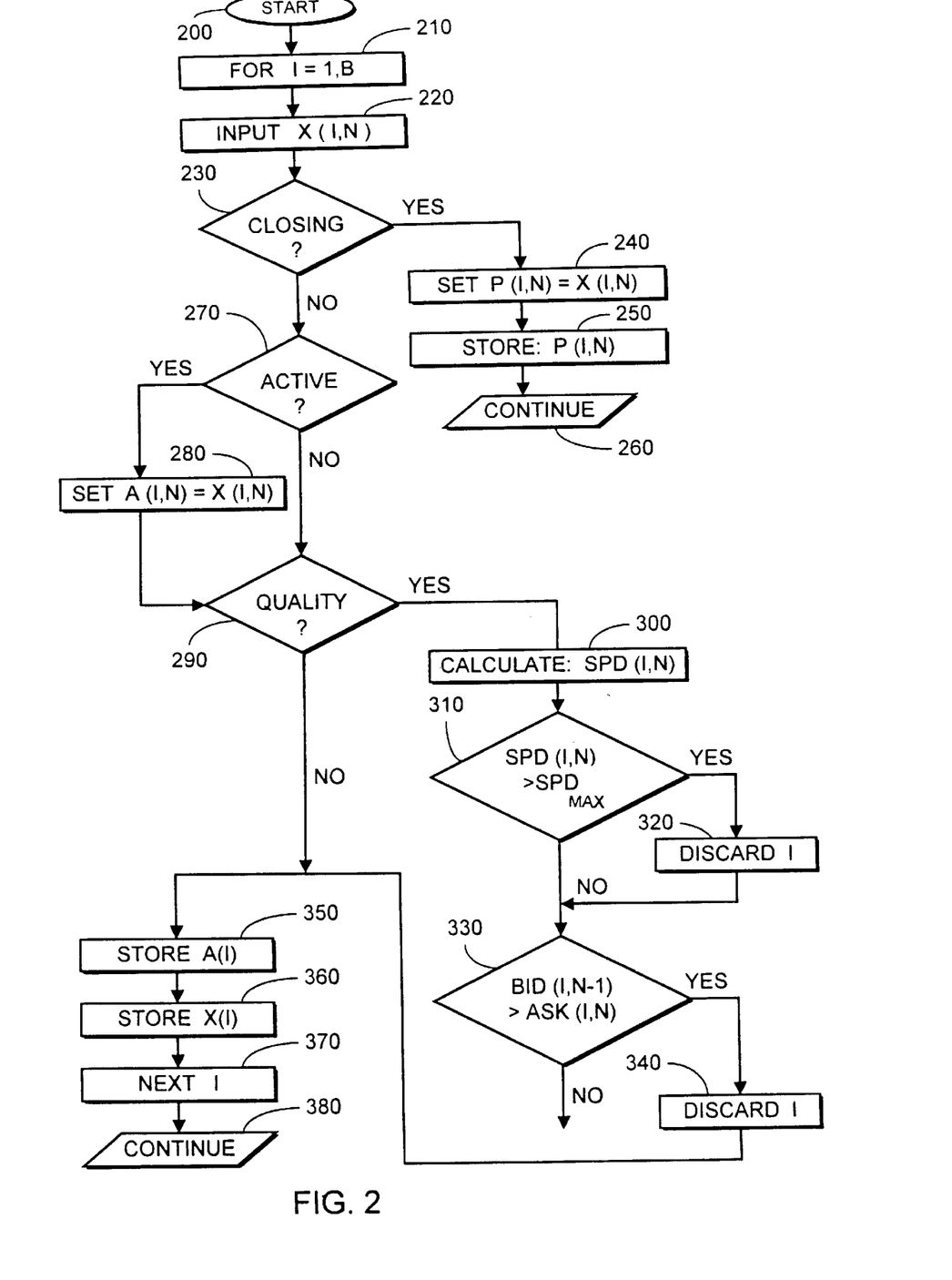
FIG. 2 is a logic flow chart depicting the processing path for the data acquisition and qualification module of the present invention.

Assuming a negative response to test 230, logic continues to test 240 wherein the instant transaction is qualified as an active (most recently auctioned issue) treasury. A positive response to test 270 branches to block 280. At block 280, the current transaction data is assigned into the matrix of data values for actives A(I, N). Alternatively, a negative response to test 270 bypasses block 280 and the security will remain in the X(I, N) file set.

The next sequence of operation involves data qualification. More particularly, as the system receives an incoming stream of price information for plural securities, it must discern the validity and quality of the data on an instantaneous basis. This incoming data will include both bid and ask quotes for a given security and possibly a transaction price. The filters within the system for data screening purposes are fluid to the extent that practice and historical results will influence the relative weight given any filter factor. For example, during initial operation all actives will be considered good data so that a sizable database may be quickly accumulated. At some subsequent time, an active filter criteria may be employed to enhance the overall quality of the ensuing models generated from the actives.

Continuing with FIG. 2, test 290 queries whether a given security requires qualification. A positive response branches logic to block 300, where the first criteria applied involves measuring the spread between the bid and ask price currently quoted, SPD(I, N). At test 310, the current spread for that security is compared with a preset price spread maximum value, $SPD_{max}$. This preset spread limit is adjustable and may be initially set at 5/32 seconds; i.e., a difference between bid and ask sides of the market of 5/32 seconds. A positive response to test 310, branches to block 320 wherein the system discards the price information for that security. This data is removed from the data set because such a wide spread reflects unusual market conditions for that security.

A second criteria for retaining data involves comparing current bid/ask pricing with recent bid/ask pricing for differing securities. For example, if the current ask price of a given security is less than a recent bid price of the same or analogous security, this reflects a rapid shift in market conditions rendering the recent data unreliable. This process is depicted in test 330 with a positive response branching to block 340 for the removal of the disqualified data.

The remaining data sets are thereafter stored in matrix address format. At block 350, the active data is stored at A(I) and, at block 360, the inactive data is stored at matrix address X(I). This is repeated for each security on the data set via next command, at block 370, and continues in real time via block 380. In fact, except for the closing data, most, if not all, incoming transactions will be received on an asynchronous basis thereby creating a fluid database for processing in connection with the following logic commands.

The first phase of system operation is directed to the preparation of the term structure of interest rates at a pre-selected time. By definition, the term structure provides a set of spot rates sufficient to price a given note based on the note price data, the coupon rate and coupon payment cycle. Assuming a note with five remaining coupons, the term structure and associated spot rates corresponding with the five coupon dates and the current price data provide the requisite information to set up the N equations with N unknowns—in this case N=5—for simultaneous solution. The actual underlying mathematics is well known and explained in text materials, such as *Strategic Fixed Income Investment* by Thomas S. Y. Ho, Dow Jones-Irwin Homewood, Ill. 60430, the contents of which are hereby incorporated by reference as if restated in full.

The necessity of actual data multiplies as the number of securities increases with a corresponding number of simultaneous equations for solution. As the data needs increase, a data filter must be established to confirm the viability of select data entry. This process is depicted in detail in FIG. 2. As presented therein, a complete set of data is available at select times associated with market closing, etc. This is exemplified by the closing price data released by the Federal Reserve for the securities traded each day.

Taking the closing data as the starting data set, the entire term structure can be established spanning, e.g., ten years. Generating this term structure and the associated spot rates is accomplished in accordance with the functions depicted in FIG. 3. In this context, spot rate is the market established rate of interest to a given maturity date in the future, e.g., the date associated with a coupon payment. This spot rate is required for the determination of the net present value (NPV) of the future coupon payment given today's market conditions. As will be seen, the price of a given note is the sum of the NPVs of each of its coupons and the NPV of the final return of principal at maturity.

Figure 3:
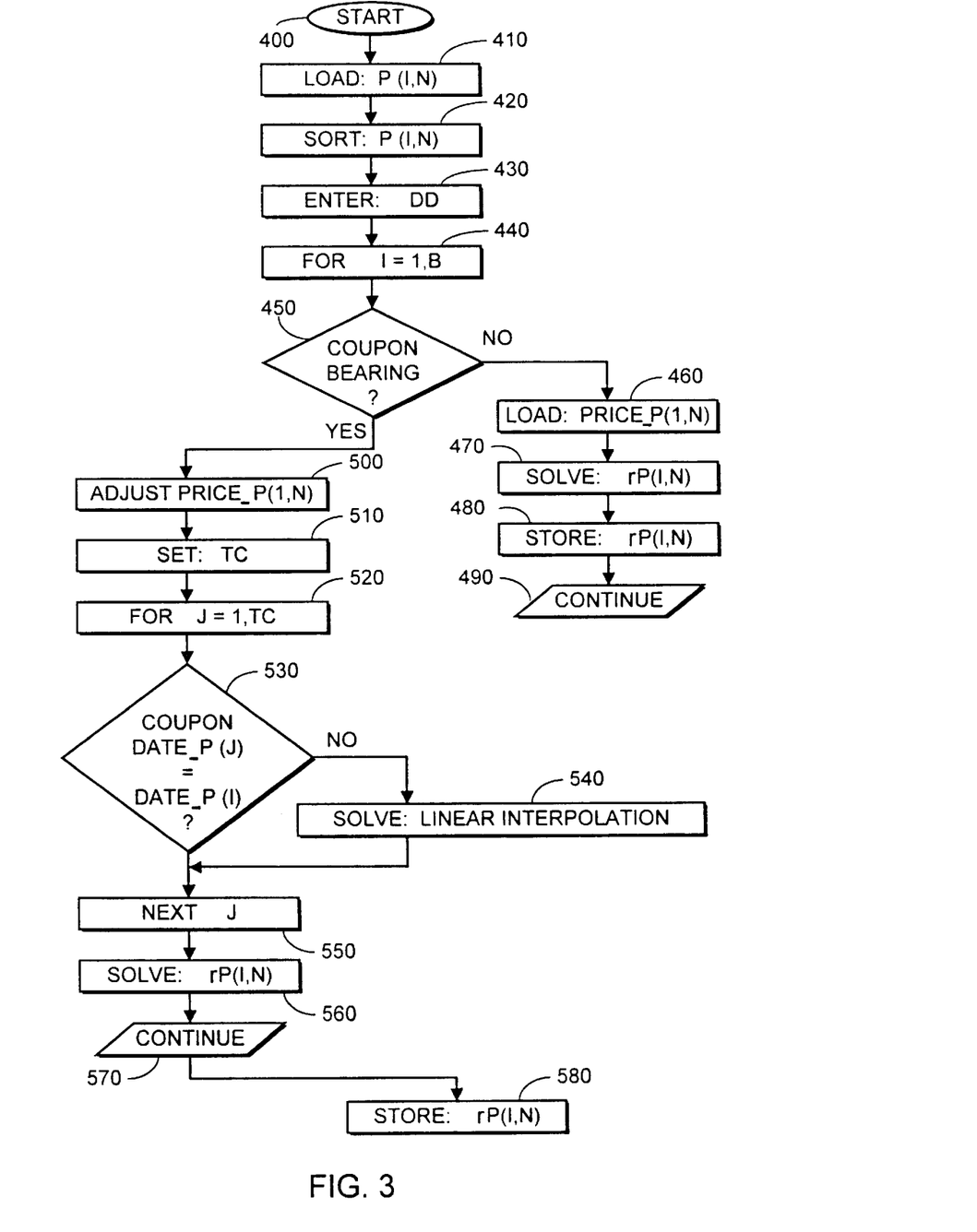
FIG. 3 is a logic flow chart depicting the processing logic for the determination of the present term structure of interest rates based on the current qualified data matrix.

Turning now to FIG. 3, logic conceptually begins at block 400, proceeding to block 410 for the accessing of the final closing numbers of a set of relevant securities, i.e., the final Fed data on the treasuries for that day. This set of data will include bid, ask and trade price data for each security actively marketed during the day. The system couples this data with the underlying biographies for each security creating a proper set of data that provides the coupon dates, coupon rate, remaining coupons, and maturity date, stored in matrix form at P(I, N), wherein I is the security ID counter and N is a date/time counter.

The table of variables used in the following flow diagrams is depicted hereinbelow:

TABLE

| | |
|---|---|
| Date_X(I) | = maturity date of X(I) |
| coupon_X(I) | = coupon rate for X(I) |
| Coupon Date_X(I,1,J) | = date of Jth coupon for X(I) |
| rX(I) | = spot rate to date_X(I) |
| Discount_X(I) | = discount rate of X(I) |
| p | = subset X (proper) |
| U | = subset X (updates) |

The proper set P, of data provides all the information required to set up and solve the simultaneous equations to define the term structure of interest rates spanning these securities. The first processing step is the sort operation, block 420, which arranges the security database P(I, N) by maturity date, i.e, earlier maturing securities are prioritized. At block 430, the delivery date, DD is entered and logic then proceeds via loop command 440 to test 450. At this stage, the system determines whether the security is coupon bearing; it not (e.g., a T-bill), logic branches to block 460 for accessing price information for the security. To solve for the spot rate, two equations are set up for the security price. These equations are presented below:

$$\text{Price\_}P(I) = 100 \left( \frac{\text{Date\_}P(I) - DD}{360} \right) \text{Discount\_}P(I) \quad (1)$$

$$\text{Price\_}P(I) = \frac{100}{(x^Y)} \quad (2)$$

wherein $$X = 1 + \frac{rP(I)}{2} \text{ ; and}$$

$$Y = \frac{\text{Date\_}P(I) - DD}{(\text{Coupon Date\_}P(I,N+1)} - \text{Coupon Date\_}P(I,N)$$

By setting these two price equations equal to each other, the spot rate defined by this security can be determined:

$$rP(I) = Z^* \left( \frac{1}{1 - \frac{\text{Discount\_}P(I)}{100} \left( \frac{\text{Date\_}P(I) - DD}{360} \right)} \right) - 1 \quad (3)$$

wherein $$Z = 1/Y$$

For T-bills, no coupons exist, thus simplifying the above relationship. The calculated spot rate is solved at block 470 and then stored at block 480; logic then proceeds to the next security I+1 via continue command at block 490.

Assuming a negative response to test 450, the security is coupon bearing and logic proceeds to block 500, et seq., for the discounting of the security and all of its associated coupons for the spot rate determination. The first step is to adjust the security price for accrued interest associated with the next coupon payment. This is accomplished with the following relationship:

$$\text{Price\_}P(I) = \text{Price\_}P(I) + \frac{A \text{ Coupon\_}P(I)}{2} \quad (4)$$

wherein $A = [DD - \text{Coupon Date } P(I,N)]/[\text{Coupon Date\_}P(I,N+1) - \text{Coupon Date\_}P(I,N)]$ At block 510, the system sets the number of remaining coupons associated with the instant security TC to act as a counter for the iterative ensuing processing. This is initiated by loop command 520, and test 530. At test 530, the system determines whether the coupon date associated with the instant security matches the maturity date of a security in the P(I, N) database. If so, the spot rate is calculated, as above, using the price data; if a match is not found with an existing maturing security, the system logic branches to block 540 and interpolates from existing maturity dates on either side of the coupon date. The use of linear interpolation is a reasonable approximation, as the maximum length of time between maturity securities is six months.

This process is repeated for each value of J, block 550, and with the resultant data used to calculate the spot rate for the Ith security, rP(I, N), block 560. This is repeated for the entire set of securities from the closing price data, block 570, and stored for subsequent use, block 580.

Use of closing data from the Federal Reserve provides a complete set of data at a set point in time. After time, it becomes stale and needs to be updated rapidly with incoming asynchronous data on current transactions taking place in the market. This is accomplished via the flow path depicted in FIG. 4. Logic conceptually begins at start block 600 and inputs the set of qualified actives in real time (i.e., within seconds of actual changes in a security price in terms of offer, bid and trade values). The Active A(I, N) is compared to the existing proper set P(I, N-1) for the previous time cycle (N-1) to discern whether new information is available on an existing security. If yes, logic branches to block 630 and the new price data is used to update the spot rate for that security, via block 640.

Figure 4:
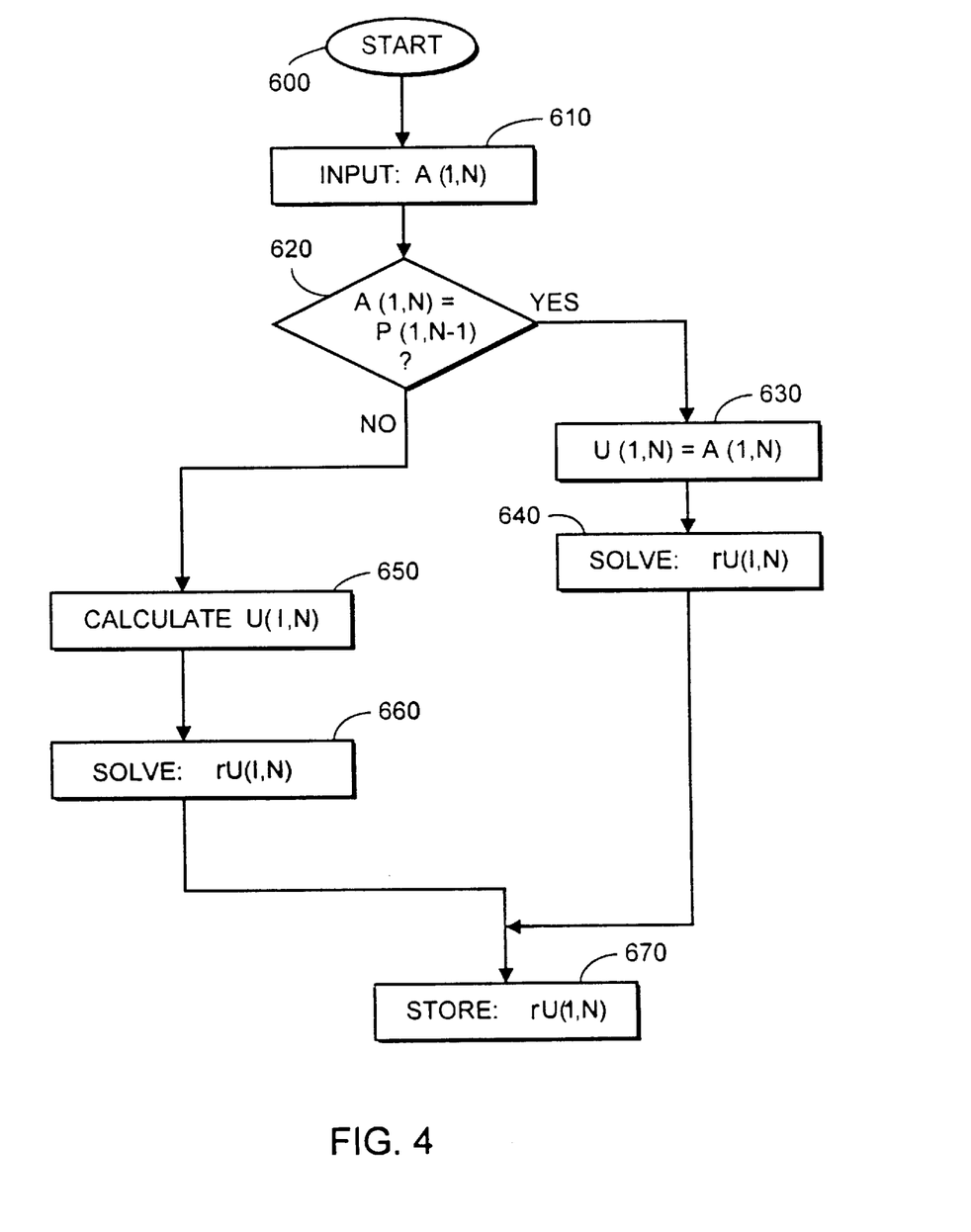
FIG. 4 is a logic flow chart depicting the real time update operation.

Assuming a negative response to test 620 as no new data is received for a given member of the proper set, logic branches to block 650 for use of proximate securities having new price data as pivot points to recalculate the spot rate for the security without updated information, block 660. More particularly, the spot rate of the security that has not been updated is calculated as a convex combination of the two nearest spot rates for which there is new (updated) information. The updated spot rate data is used to complete the data set, block 670.

The spot rate data set, as continuously updated with new trading information, is used to price a generic portfolio of select securities as expressed in terms of price relating to par, yield to maturity (YTM) and duration. This is accomplished for the exemplary portfolio described above by the logic path presented in FIG. 5. Logic conceptually begins at start block 700, followed by test 710, which determines whether the data set is closing or updated continuously; if closing (yes to test 710), logic proceeds to block 730 and the proper closing data on the term structure is used. If asynchronous, the update set of data is used, block 720.

In either event, the previous index values for the portfolio are loaded, block 740, and then iteratively processed with the new market data. More particularly, the system iteratively determines the net present value for each of the four generic securities in the portfolio, including each coupon by correlating the coupon and maturity dates for the generic issues with the data set for spot rates; if a match occurs via test 780, the matching spot rate in the data set is used to calculate the NPV of the coupon, block 790, et seq. This is repeated for each coupon, J, and each generic security in the portfolio, K.

Once the NPV is set for all of the components in the portfolio, the system calculates the portfolio price, block 850, the yield to maturity, YTM, block 860, and the portfolio duration, block 870. This information is displayed and made available to the associated network as an index, updated in real time by current price data, in a manner analogous to the S & P 500 and Dow Jones 30 Industriales block 880.

In a separate aspect of the present invention the foregoing index is used as the measure of current valuation in support of a futures market based on an underlying portfolio for the index. Through an interconnected data network augmented with access to centralized brokers by telephone connection, the system offers automated electronic executions of futures and options on the index for e.g. treasury notes and its corresponding cash security equivalents.

By viewing through vendors in real time the price and yield of the treasury note, index traders, investors, pension fund managers, and other participants make determinations of market valuations of the duration sized portfolio. In so doing, bid, offer and execution decisions are implemented instantaneously by traders. These decisions are enacted through computer terminals that are interconnected through international data networks and processors to effectuate in real time the display of quantities for bids and offers and the "hitting" and "taking" of those bids and offers which then result in an executed trade. These trades are then electronically displayed and distributed to a clearing processor and at the same time to data vendors for redistribution to the worldwide financial community.

One function of the future transaction processor is the determination of the least expensive portfolio of securities deliverable pursuant to the future contract at the delivery date. Future contracts based on the index determined above will require delivery of a combination of securities having 2, 3, 5 or 10 year maturities that, in combination, match the index duration and further comprise at most 50% of any one issue (e.g. 3 year notes). Given this criteria, at the delivery date, the system scans the market for 2, 3, 5 and 10 year notes, testing each combination of current issues to provide the least expensive matching combination and providing a delineation of the least expensive combination.

The system attributes described above may be more clearly understood in the context of the flow chart depicted in FIG. 6. Beginning with block 900, the system collects in real time the market positions of participating fixed income security traders as expressed in their various bid, offer and trade price data. This information is collated and conformed to a common format, block 910 and coupled with the existing treasury database, block 920 to discern a futures conversion factor, block 930.

The first operation is to organize the data into respective maturities that are associated with the specific index governing the future contract obligations. This is represented by the selection processor, block 940. The data for each class of securities, i.e., 2, 3, 5 and 10 year maturities is then sorted by price delineating the least expensive note within each class, block 950. The linear programming module, block 960, uses the sorted collection of notes in a minimalization algorithm that searches by trial and error for the least expensive portfolio that conforms to the delivery requirements of the futures contract.

The least expensive portfolio data is distributed three ways; first it is provided to the data vendors to the financial community, block 970. It is also directed to the options parameter processor, block 980 for support of the transactions on the various options exchanges. The least expensive portfolio data is finally processed forming a "basis" quantifying the difference between the least expensive portfolio and the index value, block 990. This information is likewise distributed to the various market participants and exchanges as diagrammed. In this manner, the actual real time index and least expensive portfolio values support the trading in future and option contracts, with current valuation and delivery expense determinations.

The above-described arrangement is merely illustrative of the principles of the present invention. Numerous modifications and adaptations thereof will be readily apparent to those skilled in the art without departing from the spirit and scope of the present invention.

What is claimed is:

1. A system for processing disparate price data on fixed income securities in real time, comprising:

means to provide an index value corresponding to a portfolio of pre-select generic issues expressed in terms of price, yield to maturity and duration wherein said index value is used to support a market in futures and options contracts corresponding to said portfolios;

a means for sifting through current price data of securities corresponding to said generic issues and calculating a composition of current securities minimizing the cost of said portfolio for delivery pursuant to said futures and options contracts; and a means for communicating the results of said calculated composition of current securities and distributing least expensive portfolio data in said real time to market participants for supporting trades in said futures and options contracts.

2. The system of claim 1 wherein said means to provide an index value includes data collection means for receiving data on a proper set of securities associated with the closing price of said securities as expressed by an established securities market.

3. The system of claim 2 wherein said data collection means further includes means for receiving data in real time corresponding to market activity at one or more markets trading fixed income securities.

4. The system of claim 1 wherein said generic issues are U.S. Treasuries having maturities of 2, 3, 5 and 10 years.

5. The system of claim 4 wherein said generic issues are priced in current terms and sorted by least expensive to deliver on a pre-selected date.

6. In combination in a system for processing fixed income security data to create an index value correlating said data and using said index value to sponsor trading or future and/or option contracts said system comprising:

a. Market data collection processor for tracking market transactions as defined by a plurality of buyers and sellers of fixed income securities placing bid and ask price offerings corresponding to one or more of said fixed income securities;

b. Index processor for iteratively establishing an index corresponding to a plurality of fixed income instruments and expressed in terms of market value, yield, and duration;

c. Market data qualification data processor providing logic instructions for qualifying a portfolio of select fixed income securities in terms of a least expensive portfolio at a set delivery time;

d. Index differential processor for quantifying the difference in value between said least expense portfolio and said index value; and e. Communication means for distributing electronic data corresponding to said differential to one or more future and/or options trading exchanges.

7. The system of claim 6 wherein said market data qualification data processor further converts current prices for securities within said index value into a corresponding future value.

8. The system of claim 6 wherein a price sort is undertaken for issues having maturities of two, three, five and ten years.

9. The system of claim 8 wherein said portfolio of two, three, five and ten year issues is processed to minimize the cost of delivery at a set future date.

* * * * *